(12) United States Patent
Sannomiya et al.

(10) Patent No.: US 12,065,141 B2
(45) Date of Patent: Aug. 20, 2024

(54) DRIVING ASSISTANCE DEVICE

(71) Applicant: DENSO CORPORATION, Kariya (JP)

(72) Inventors: Hiroya Sannomiya, Kariya (JP);
Takaharu Oguri, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 17/399,868

(22) Filed: Aug. 11, 2021

(65) Prior Publication Data

US 2021/0370931 A1 Dec. 2, 2021

Related U.S. Application Data

(63) Continuation of application No. PCT/JP2020/003230, filed on Jan. 29, 2020.

(30) Foreign Application Priority Data

Feb. 12, 2019 (JP) ................................. 2019-023030

(51) Int. Cl.
*B60W 30/095* (2012.01)
*B60W 30/09* (2012.01)
*B60W 30/18* (2012.01)
*B60W 40/04* (2006.01)
*B60W 50/00* (2006.01)
*G06V 20/58* (2022.01)

(52) U.S. Cl.
CPC ........ *B60W 30/0956* (2013.01); *B60W 30/09* (2013.01); *B60W 30/18154* (2013.01); *B60W 40/04* (2013.01); *B60W 50/00* (2013.01); *G06V 20/58* (2022.01); *B60W 2554/4048* (2020.02)

(58) Field of Classification Search
CPC ................................................ B60W 30/0956
See application file for complete search history.

(56) References Cited

U.S. PATENT DOCUMENTS 9,460,627 B2 * 10/2016 Minemura ............. G08G 1/166
9,904,856 B2 * 2/2018 Liu ........................... G06T 7/74
10,262,534 B2 * 4/2019 Okada ................... B60W 10/20
11,351,997 B2 * 6/2022 Oguri ..................... G08G 1/166
(Continued)

FOREIGN PATENT DOCUMENTS

JP 2015-82157 A 4/2015

*Primary Examiner* — Michael A Berns
(74) *Attorney, Agent, or Firm* — MASCHOFF BRENNAN

(57) ABSTRACT

A driving assistance device performs collision avoidance control for avoidance of a collision between a vehicle and an object being around the vehicle and detected by an object detector, the collision avoidance control being performed based on collision determination as to a collision between the object and the vehicle. The driving assistance device includes: an object sensing section that senses an object around the vehicle; a blind spot area setting section that sets a blind spot area at an area positioned in the vehicle's blind spot blocked by an obstacle sensed by the object sensing section; an early determination area setting section that sets an early determination area including the blind spot area and extended therefrom; and a collision determination section that accelerates the collision determination for an object sensed in the early determination area, compared with the collision determination for an object sensed outside the early determination area.

14 Claims, 7 Drawing Sheets

(56) References Cited

U.S. PATENT DOCUMENTS

| | | | |
|---|---|---|---|
| 2014/0324330 A1 | 10/2014 | Minemura et al. | |
| 2016/0335892 A1 | 11/2016 | Okada et al. | |
| 2019/0329768 A1* | 10/2019 | Shalev-Shwartz | ........................... B60W 60/001 |
| 2020/0130683 A1 | 4/2020 | Oguri et al. | |
| 2021/0370931 A1* | 12/2021 | Sannomiya | ....... B60W 30/0956 |
| 2022/0406186 A1* | 12/2022 | Watanabe | .............. G06V 20/56 |

* cited by examiner

FIG.2
(a)
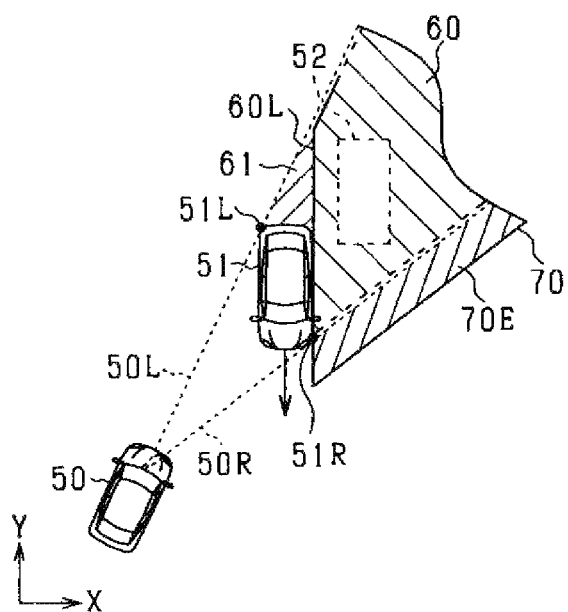
(b)
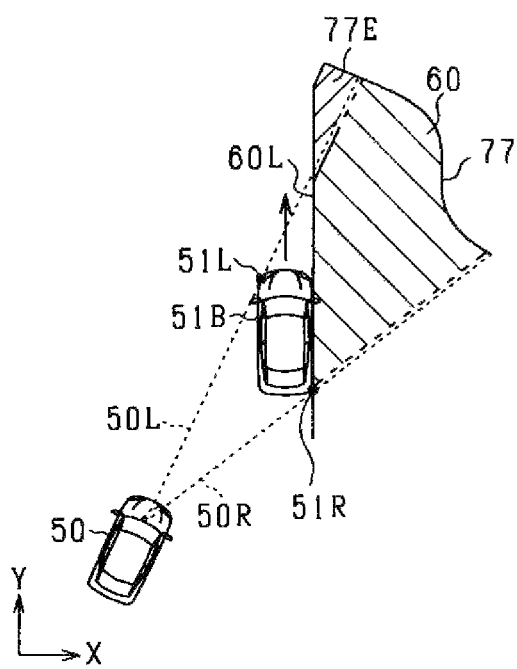
(c)
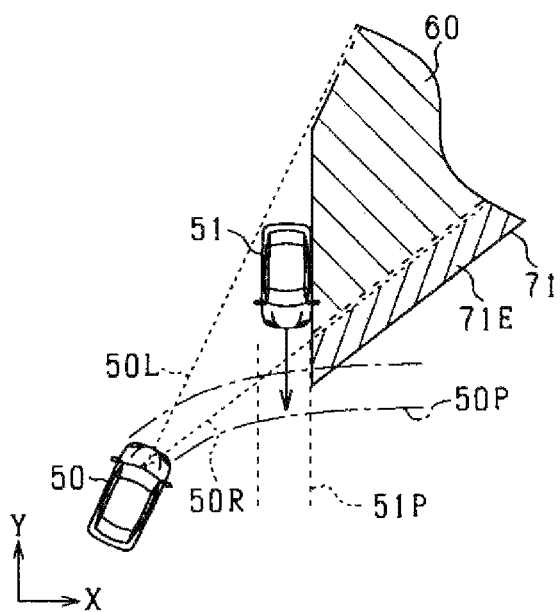
(d)
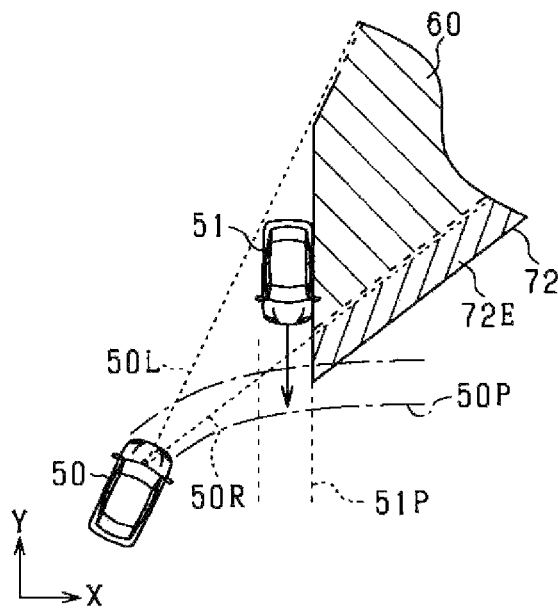

DRIVING ASSISTANCE DEVICE

CROSS-REFERENCE TO RELATED APPLICATION

The present application is based on and claims the benefit of priority from earlier Japanese Patent Application No. 2019-023030 filed on Feb. 12, 2019, the description of which is incorporated herein by reference.

BACKGROUND

Technical Field

The present disclosure relates to a driving assistance device that performs collision avoidance control for avoidance of a collision between an own vehicle and an object around the own vehicle.

Related Art

A driving assistance device is known which performs braking or other collision avoidance control when an own vehicle and an object around the own vehicle are determined to be likely to collide with each other.

SUMMARY

As an aspect of the present disclosure, a driving assistance device for performing collision avoidance control for avoidance of a collision between an own vehicle and an object being around the own vehicle and detected by an object detector is provided. The collision avoidance control is performed based on collision determination as to a collision between the own vehicle and the object. The driving assistance device includes: an object sensing section configured to sense an object around the own vehicle; a blind spot area setting section configured to set a blind spot area at an area positioned in an own vehicle's blind spot blocked by an obstacle, which is a moving body, sensed by the object sensing section; an early determination area setting section configured to set an early determination area including the blind spot area and extended from the blind spot area along a path of the obstacle estimated based on a traveling direction of the obstacle or a traveling state of the obstacle; and a collision determination section configured to accelerate the collision determination for an object sensed in the early determination area, compared with the collision determination for an object sensed outside the early determination area.

BRIEF DESCRIPTION OF THE DRAWINGS

In the accompanying drawings:

FIG. 2 illustrates blind spot areas and early determination areas;

DETAILED DESCRIPTION OF THE PREFERRED EMBODIMENTS

A driving assistance device is known which performs braking or other collision avoidance control when an own vehicle and an object around the own vehicle are determined to be likely to collide with each other. Appropriate avoidance of a collision with a moving body emerging from a blind spot of the own vehicle needs quick completion of the process for sensing the moving body emerging from the blind spot of the own vehicle, performing collision determination as to whether the sensed moving body will collide with the own vehicle, and performing collision avoidance control. JP 2015-82157 A describes a technique in which a possible moving body within a blind spot area is set as a virtual target, and if the virtual target is likely to collide with the own vehicle, a sensor narrows its object sensing range in the vicinity of the boundary of the blind spot area from which the virtual target would emerge. The sensor senses the moving body earlier to achieve early detection of the situation in which the virtual target emerges from the blind spot.

JP 2015-82157 A discloses a technique for accelerating object sensing by a sensor, not a technique for accelerating collision determination as to a sensed object.

In view of the above, an object of the present disclosure is to provide a technique for accelerating collision determination between an own vehicle and an object appearing from its blind spot area.

First Embodiment

Figure 1:
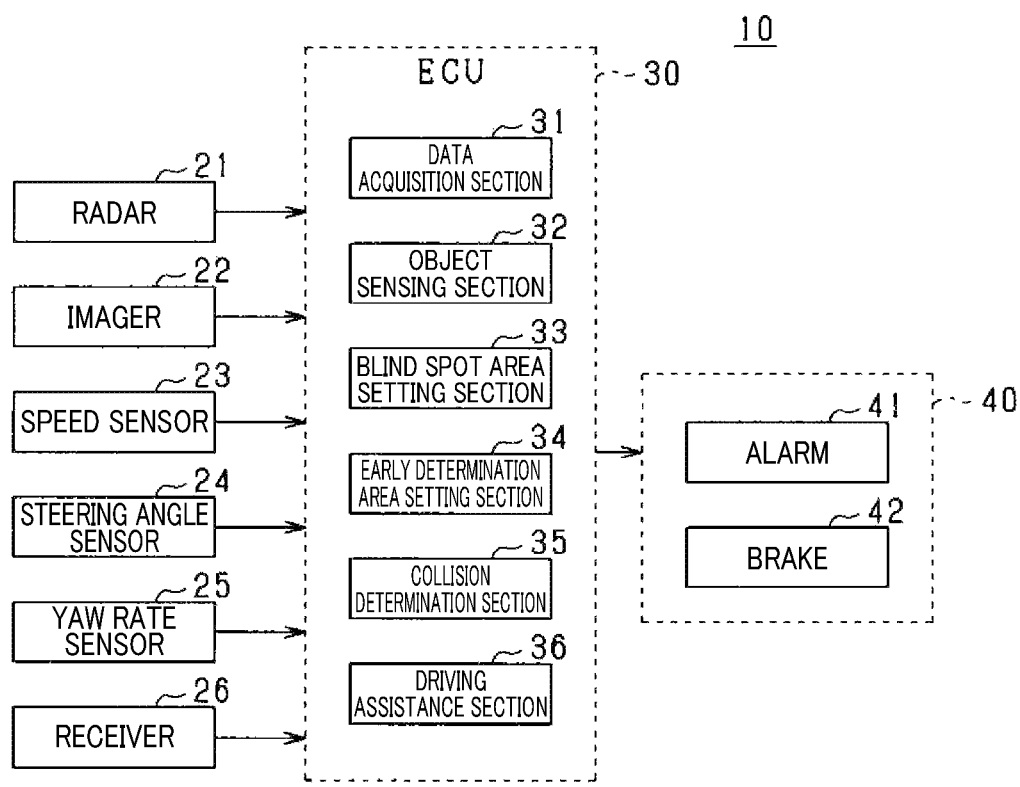
FIG. 1 is a block diagram illustrating a driving assistance system including a driving assistance device according to a first embodiment.

As shown in FIG. 1, a driving assistance system 10 according to the embodiment includes a radar 21, an imager 22, a vehicle speed sensor 23, a steering angle sensor 24, a yaw rate sensor 25, a receiver 26, an ECU 30, and a controlled device 40. The controlled device 40 includes an alarm 41 and a brake 42. The driving assistance system 10 is incorporated in an own vehicle and functions as a pre-crash safety (PCS) system that performs control to avoid a collision between the own vehicle and an object determined to collide with the own vehicle or reduce collision damage to the own vehicle.

The radar 21 is, for example, a known millimeter-wave radar that uses a high frequency signal within a millimeter-wave band as a transmission wave. The own vehicle may have a single radar 21 or a plurality of radars 21. The radar 21 is mounted, for example, on the front end or the like of the own vehicle. The radar 21 defines an area within a predetermined sensing angle as a sensing range in which an object can be sensed, and locates an object within the sensing range. Specifically, the radar 21 transmits a probe wave periodically and receives reflected waves through a plurality of antennas. The transmission time of a probe wave and the reception time of a reflected wave can be used to calculate a distance from an object. Furthermore, the change in frequency of a reflected wave from an object due to the Doppler effect can be used to calculate a relative velocity. In addition, a phase difference between reflected waves received through the plurality of antennas can be used to calculate the direction to the object. If the position and the direction of the object are calculated, a relative position of the object to the own vehicle can be determined.

The imager 22 may be a monocular camera such as a CCD camera, a CMOS image sensor, or a near-infrared camera or may be a stereo camera. The own vehicle may have a single imager 22 or a plurality of imagers 22. The imager 22 is mounted, for example, at a predetermined height in the width-directional center of the vehicle, and from above, images an area spreading at a predetermined angle forward or rearward from the vehicle. The imager 22 extracts feature points indicating the presence of an object in the captured image. Specifically, the imager 22 extracts edge points based on the luminance information about the captured image, and performs the Hough transform on the extracted edge points. For example, the Hough transform extracts, as feature points, points on a straight line having consecutive edge points and the intersections of orthogonal straight lines. The imager 22 outputs successively captured images to the ECU 30 one after another as sensing information.

The radar 21 and the imager 22 are example object sensing devices that acquire the environmental information about the own vehicle. Other examples of object sensing devices include sensors that send a probe wave such as an ultrasound sensor and LIDAR (light detection and ranging/laser imaging detection and ranging). A millimeter-wave radar such as the radar 21 or a sensor that sends a probe wave such as a laser sensor, sonar, or LIDAR receives a reflected wave from an obstacle to obtain a reception signal, and outputs scanning results that are based on the reception signal to the ECU 30 one after another as sensing information.

The above various object sensing devices may sense not only a forward or a side object from the own vehicle but also a rearward object and use the sensing results as positional information. The target object to be monitored may also be changed in accordance with the type of the object sensing device to be used. For example, when the imager 22 is used, target objects are preferably stationary objects such as road signs and buildings. When the radar 21 is used, target objects are preferably objects that reflect at high electrical power. The object sensing device to be used may be selected in accordance with the types, the positions, and the moving speeds of target objects.

The speed sensor 23 is a sensor that senses a traveling speed of the own vehicle such as, but not limited to, a wheel speed sensor capable of sensing a wheel rotational speed. The wheel speed sensor used as the speed sensor 23 is mounted, for example, on a wheel portion, and outputs a wheel speed signal in accordance with the vehicle wheel speed to the ECU 30.

The steering angle sensor 24 is mounted, for example, on the vehicle steering rod, and outputs a steering angle signal in accordance with the change in the steering angle of the steering wheel due to the driver's operation to the ECU 30.

The own vehicle may have a single yaw rate sensor 25 or a plurality of yaw rate sensors 25. With only one yaw rate sensor 25, it will be installed, for example, at the center of the own vehicle. The yaw rate sensor 25 outputs a yaw rate signal in accordance with the rate of change in the steering quantity of the own vehicle to the ECU 30. With a plurality of yaw rate sensors 25, the average or the median of their sensed values may be used. In calculating the average of a plurality of sensed yaw rates, the sensed values may be weighted.

The receiver 26 is a GPS receiver, which is one example global navigation satellite system (GNSS) receiver. The receiver 26 can receive positioning signals from a satellite positioning system that uses artificial satellites to determine the current ground position.

The ECU 30 functions as a driving assistance device that performs driving assistance for the own vehicle by producing a control command based on information obtained from the radar 21, the imager 22, the vehicle speed sensor 23, the steering angle sensor 24, the yaw rate sensor 25, and the receiver 26 and outputting the produced control command to the controlled device 40.

The controlled device 40 may be configured to operate based on the control command from the ECU 30 as well as operate in accordance with the driver's operation input. The driver's operation may be subjected to appropriate processing by the ECU 30 before being input to the controlled device 40 as a control command from the ECU 30.

The alarm 41 is a device for notifying the driver and other passengers, such as, but not limited to, a speaker, a buzzer, or other auditory notification device installed in the own vehicle, or a display or other visual notification device. The alarm 41 emits an alarm sound based on a control command from the ECU 30 to, for example, notify the driver of a possible danger of a collision with an object.

The brake 42 is a device for braking the own vehicle and controlled by driver's braking operation or a command from the ECU 30. The ECU 30 may have a brake assist function that increases braking force of the driver's braking operation and an automatic brake function that activates automatic braking without the driver's braking operation, as brake functions for avoidance of a collision with an object or reduction in collision damage. The brake 42 allows brake control by these functions based on a control command from the ECU 30.

The controlled device 40 may also include a steering unit for steering the own vehicle and a drive unit including a vehicle driving source such as an internal combustion engine, a motor, and a storage battery.

The ECU 30 includes a data acquisition section 31, an object sensing section 32, a blind spot area setting section 33, an early determination area setting section 34, a collision determination section 35, and a driving assistance section 36. The ECU 30 includes a CPU, ROM, RAM, and an I/O unit, and the CPU executes programs installed in the ROM to implement the functions of the above sections.

The data acquisition section 31 acquires sensing data obtained by the radar 21, the imager 22, and the sensors 23 to 25 and positioning signals received by the receiver 26. Various kinds of data acquired by the data acquisition section 31 and values calculated based on the various kinds of data may also be stored in the ECU 30.

The object sensing section 32 can sense an object around the own vehicle based on sensing data obtained from the object sensing devices such as the radar 21 and the imager 22. For example, as shown in FIG. 2, the object sensing section 32 of an own vehicle 50 can sense another vehicle 51 being in the traveling direction (ahead) of the own vehicle 50. It is preferable that the object sensing section 32 be configured to identify sensed objects. For example, it is preferable that the object sensing section 32 be configured to identify a sensed object as a car, a bicycle, a motorcycle, a person, an animal, or a stationary ground object such as a guardrail.

The blind spot area setting section 33 sets a blind spot area at an area blocked by an obstacle sensed by the object sensing section 32, that is, an area positioned in a blind spot of the own vehicle. Note that an obstacle refers to an object sensed by the object sensing section 32 and blocking the object sensing devices such as the radar 21 and the imager 22 from sensing. The blind spot of the own vehicle disables the object sensing devices for sensing. The obstacle may be a moving body or a stationary body. It is preferable that the blind spot area setting section 33 be configured to determine, for every object sensed by the object sensing devices, whether the object produces a blind spot for the own vehicle, and for every object determined to produce a blind spot, set a blind spot area with the object treated as an obstacle.

The blind spot area setting section 33 determines whether the object sensing devices such as the radar 21 and the imager 22 have a blind spot (an area that cannot be sensed by the object sensing devices), and sets a blind spot area when there is a blind spot. The blind spot area setting section 33 may set the entire blind spot as a blind spot area, or a part of the blind spot as a blind spot area. For example, based on the orientation and the traveling direction of an obstacle, the blind spot area setting section 33 may set, as a blind spot area, a partial area estimated to be highly likely to need accelerated collision determination as to a moving body emerging from the area.

The blind spot area setting section 33 may be configured to set a blind spot area beyond an obstacle from the own vehicle. The further area of an obstacle from the own vehicle corresponds to an area positioned in the blind spot of the own vehicle.

The blind spot area setting section 33 may be configured to set a blind spot area based on the angle formed by the own vehicle and sensing points indicating the outer edge of an obstacle. Based on the angle formed by the own vehicle and the sensing points indicating the outer edge of the obstacle, the blind spot area setting section 33 may set an edge line from the own vehicle position to each sensing point and define the area within the edge lines as a blind spot area.

For example, as shown in FIG. 2(*a*), the other vehicle 51 sensed ahead of the own vehicle 50, almost facing the own vehicle 50, and moving nearer to the own vehicle 50 is determined as an obstacle. The angle formed by the own vehicle 50 and sensing points 51R and 51L indicating the outer edge of the other vehicle 51, which is an obstacle, is calculated. The sensing point 51L is the leftmost sensing point of the other vehicle 51 as viewed from the own vehicle 50, whereas the sensing point 51R is the rightmost sensing point of the other vehicle 51 as viewed from the own vehicle 50. The angle calculated from the sensing point 51L is used to set a leftmost line 50L, and the angle calculated from the sensing point 51R is used to set a rightmost line 50R. The leftmost line 50L is an edge line extending substantially through the sensing point 51L, whereas the rightmost line 50R is an edge line extending substantially through the sensing point 51R.

Of the area defined between the leftmost line 50L and the rightmost line 50R in this case, the further area of the other vehicle 51 from the own vehicle 50 (specifically, the areas denoted by reference numerals 60 and 61) is an area positioned in the blind spot of the own vehicle. In an example, when the areas 60 and 61 beyond the other vehicle 51 from the own vehicle 50 are set as a blind spot area, the entire area positioned in the blind spot of the own vehicle 50 is defined as the blind spot area.

The sensing points indicating the outer edge of the other vehicle 51, which is an obstacle, are not limited to the leftmost sensing point 51L and the rightmost sensing point 51R, and other sensing points on the outer edge of the other vehicle 51 may also be used. The number of sensing points may be two or more and is not limited to a particular number. However, four or more sensing points are preferably used. It is further preferable to use sensing points positioned substantially at the right end and the left end on the outer edge of the other vehicle 51.

The blind spot area setting section 33 may set a part of the area positioned in the blind spot of the own vehicle as a blind spot area. For example, the blind spot area setting section 33 may set a blind spot area defined by a line substantially parallel to the orientation or the traveling direction of the obstacle.

Specifically, as shown in FIG. 2(*a*), the orientation (forward direction) and the traveling direction of the other vehicle 51, which is an obstacle, correspond to the negative Y-direction. In this case, for the area positioned in the blind spot of the own vehicle (the area including both the areas 60 and 61), the blind spot area setting section 33 may be configured to set, as a blind spot area 60, the further area (the positive X-directional area in FIG. 2(*a*)) defined by a line 60L substantially parallel to the orientation and the traveling direction of the other vehicle 51 (i.e., the negative Y-direction). Since the area 61 is positioned behind the other vehicle 51, an object emerging from the area 61 is likely to appear at the nearer side of the other vehicle 51. Thus, a collision is likely to be avoided without accelerating the collision determination. By excluding the area 61 from the blind spot area, the area 60, which is estimated to be highly likely to need accelerated collision determination, is defined as a blind spot area.

Figure 3:
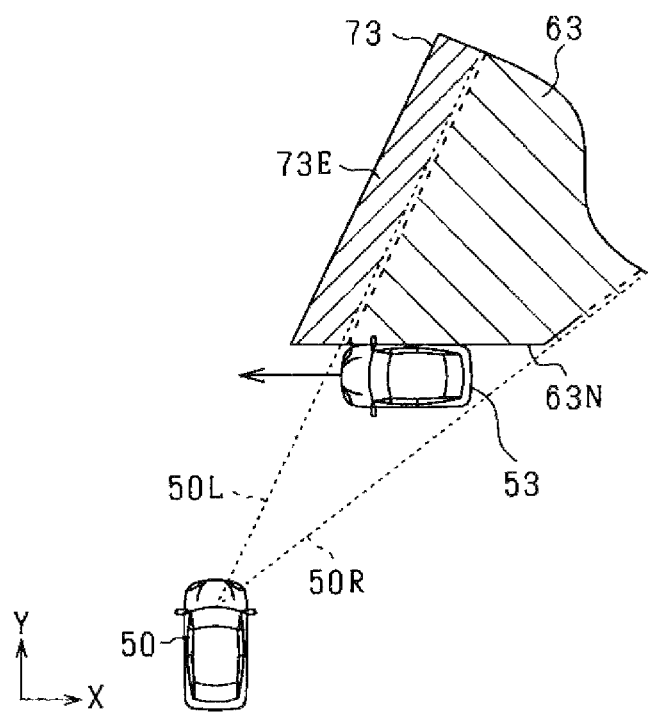
FIG. 3 illustrates a blind spot area and an early determination area.

Similarly, in an example as shown in FIG. 3, another vehicle 53 sensed ahead of the own vehicle 50 and passing in front of the own vehicle 50 in the negative X-direction is determined as an obstacle. The orientation (forward direction) and the traveling direction of the other vehicle 53, which is an obstacle, correspond to the negative X-direction. In this case, for the area positioned in the blind spot of the own vehicle 50, the blind spot area setting section 33 may be configured to set, as a blind spot area 63, the further (the positive Y-directional) area defined by a line 63N substantially parallel to the orientation and the traveling direction of the other vehicle 53 (i.e., the negative X-direction).

The blind spot area setting section 33 may be configured to set a blind spot area beyond the opposite side (further side) of the obstacle from the own vehicle. For example, the object sensing section 32 may determine the type of the obstacle to estimate the shape of the obstacle, enabling the position of the further side of the obstacle to be estimated. Specifically, for the other vehicle 51 shown in FIG. 2(*a*), the blind spot area setting section 33 may be configured to set the area beyond the positive X-directional side opposite from the own vehicle 50 (i.e., the positive X-directional area) as the blind spot area 60.

The early determination area setting section 34 sets an early determination area (priority determination/detection area) including a blind spot area and extended from the blind spot area. The early determination area is an area for which the collision determination section 35 described later is quick to make (accelerates) collision determination.

In one example, an area 70 obtained by extending the blind spot area 60 in FIG. 2(*a*) by an extension area 70E is set as an early determination area. The early determination area 70 is an area enclosed by the line denoted by reference numeral 70 in FIG. 2, and includes the blind spot area 60 and the extension area 70E. In another example, an area 73 obtained by extending the blind spot area 63 in FIG. 3 by an extension area 73E is set as an early determination area. The early determination area 73 is an area enclosed by the line denoted by reference numeral 73 in FIG. 3, and includes the blind spot area 63 and the extension area 73E.

The early determination area setting section 34 may determine whether to set an early determination area by using information acquired from the imager 22 about a road surface marking or a road sign around the own vehicle, and own vehicle positional information, geographic information, and traffic information acquired from the receiver 26, and may also determine the direction and the amount of the extension of the early determination area.

The early determination area setting section 34 may set an early determination area for every object around the own vehicle or may be configured to set an early determination area simply for an object sensed in the traveling direction of the own vehicle.

In one example, the early determination area setting section 34 may be configured to set an early determination area for the blind spot area due to an obstacle sensed in the traveling direction of the own vehicle.

In another example, the early determination area setting section 34 may be configured to set an early determination area when the own vehicle path estimated based on the current traveling state of the pen vehicle crosses the obstacle path estimated based on the current traveling state of an obstacle.

FIG. 2(c) illustrates an estimated path 50P of the own vehicle 50 and an estimated path 51P of the other vehicle 51, which is an obstacle, with the own vehicle 50 and the other vehicle 51 having the same positions and traveling states as shown in FIG. 2(a). As shown in FIG. 2(c), the early determination area setting section 34 sets an early determination area 71 when the path 50P of the own vehicle 50 and the path 51P of the other vehicle 51 cross each other.

In one example, the early determination area setting section 34 may be configured to set an early determination area when the own vehicle and an obstacle are close to each other. More specifically, for example, when the distance between the own vehicle and an obstacle is equal to or less than a predetermined distance threshold, an early determination area may be set. The distance between the own vehicle and an obstacle may be divided into the distance in the traveling direction of the own vehicle and the lateral distance substantially vertical to the traveling direction of the own vehicle, and each distance may be evaluated.

In another example, the early determination area setting section 34 may be configured to set an early determination area when the own vehicle path estimated based on the current traveling state of the own vehicle runs near an obstacle. As shown in FIG. 2(c), the early determination area setting section 34 sets the early determination area 71 when the path 50P of the own vehicle 50 runs near the other vehicle 51.

The early determination area setting section 34 may be configured to determine the possibility of the blind spot area including space for any object other than the obstacle (possibility of presence). Based on the determination result of the possibility of presence, the early determination area setting section 34 may be configured to determine whether to set an early determination area. For example, if the determination result of the possibility of presence is affirmative, that is, the blind spot area is determined to include space for any object other than the obstacle, then an early determination area may be set.

In one example as shown in FIG. 2(a), object sensing around the own vehicle by the object sensing devices may suggest the possibility of the blind spot area 60 including enough space. In this case, the blind spot area 60 can be determined to include space for any other moving body such as another vehicle 52. In another example, acquired road information around the own vehicle may indicate that the number of oncoming lanes next to the own vehicle is two or more. In this case, when the other vehicle, which is an obstacle, is found to run in the oncoming lane other than the furthest lane from the own vehicle, the blind spot area can be determined to include space for any other moving body. In yet another example, when the distance between the other vehicle, which is an obstacle, and the road edge of the traffic lane in which the other vehicle runs is equal to or more than a predetermined road edge distance threshold, the blind spot area is estimated to include enough space, and the blind spot area can be determined to include space for any other moving body.

Figure 4:
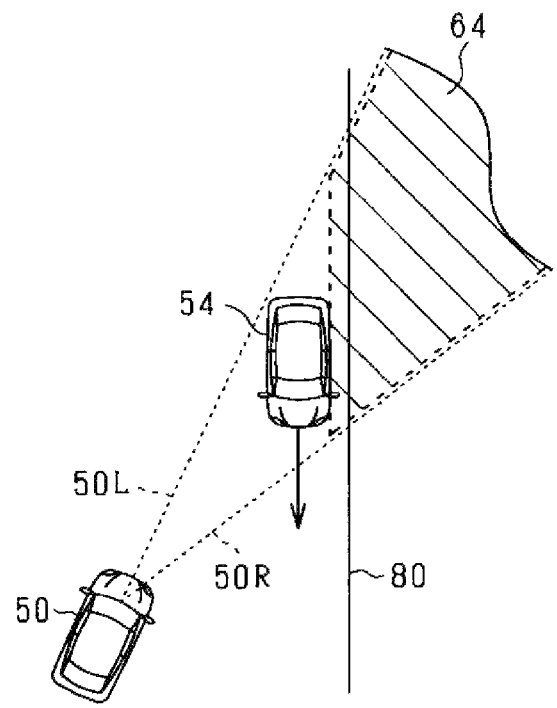
FIG. 4 illustrates determination of a possibility of presence in a blind spot area.

In another example as shown in FIG. 4, when another vehicle 54, which is an obstacle, is traveling just along a road edge 80, the other vehicle 54 and the road edge 80 have little space between them. In this case, a blind spot area 64 set for the other vehicle 54 can be estimated to include not enough space. Thus, the blind spot area 64 can be determined to include no space for any other moving body.

Even when determining the possibility of presence, the early determination area setting section 34 may be configured to set an early determination area irrespective of the determination result of the possibility of presence if a predetermined cancellation condition is satisfied. Note that a cancellation condition refers to a condition for canceling the determination of the possibility of presence.

For example, the own vehicle entering an intersection may be a cancellation condition. Note that an intersection refers to a crossroads, a T-junction, or other section where two or more roads (or roadways for roads in which sidewalks and roadways are distinct) cross each other.

Figure 5:
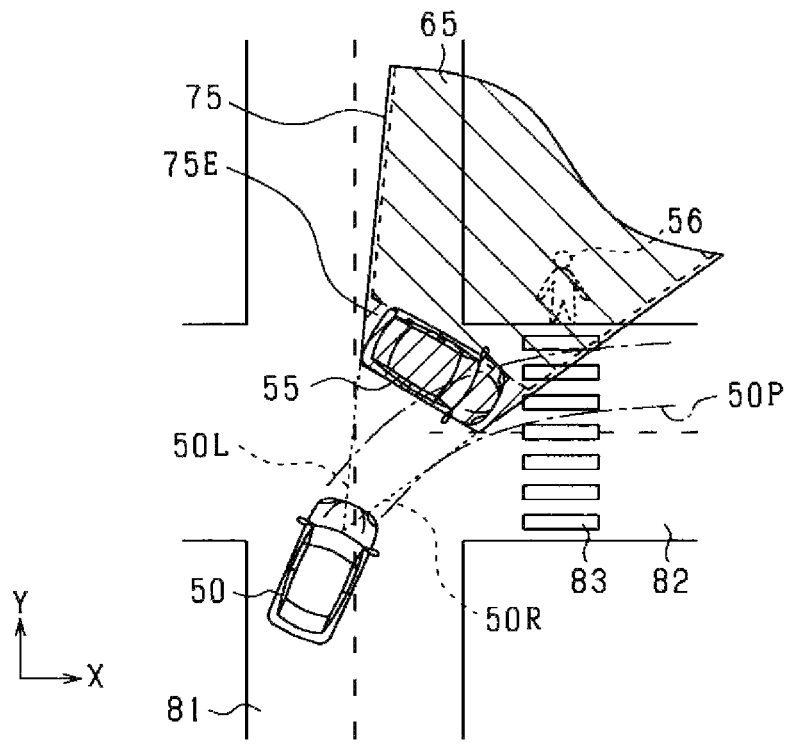
FIG. 5 illustrates a blind spot area and an early determination area at an intersection.

FIG. 5 illustrates an intersection (crossroads) where a road 81 extending in the Y-direction and a road 82 extending in the X-direction cross each other. In FIG. 5, the own vehicle 50 traveling on the road 81 enters the intersection, while another vehicle 55 traveling in the oncoming lane of the road 81 enters the intersection. In FIG. 5, the own vehicle 50 is turning right from the road 81 to the road 82, while the other vehicle 55 is turning left from the road 81 to the road 82.

As shown in FIG. 5, the other vehicle 55, which is an obstacle, and the corner of the crossroads have a small distance between them. Thus, in the determination of the possibility of presence, the distance between the other vehicle 55 and the road edge may be determined to be less than the predetermined road edge distance threshold, and a blind spot area 65 may be determined to include no space for any moving body different from the other vehicle 55.

However, there may be a pedestrian 56 who is about to cross the road 82 at a crosswalk 83 from the sidewalk outside the road. In this case, the pedestrian 56 will move toward the path 50P of the own vehicle 50, and the pedestrian 56 and the own vehicle 50 may collide with each other. Such a collision with the pedestrian 56 can easily be avoided by defining the own vehicle 50 entering an intersection as a cancellation condition. In other words, when the own vehicle 50 moves toward an intersection, an early determination area 75 is set irrespective of the determination result of the possibility of presence to facilitate avoidance.

The early determination area setting section 34 may be configured to set, as an early determination area, an area obtained by extending a blind spot area along the orientation or the traveling direction of the obstacle. For example, as shown in FIG. 2(a), the early determination area setting section 34 may set the early determination area 70 obtained by extending the blind spot area 60 in the negative Y-direction along the orientation and the traveling direction of the other vehicle 51, which is an obstacle (i.e., the negative Y-direction).

When the traveling direction of an obstacle is the same as that of the own vehicle 50, that is, as shown in FIG. 2(*b*), when another vehicle 51B that is an obstacle is traveling in the same direction as the own vehicle 50, the early determination area setting section 34 may set an early determination area 77 obtained by extending the blind spot area 60 in the positive Y-direction along the traveling direction of the other vehicle 51B (i.e., the positive Y-direction). Note that the other vehicle 51B is a vehicle traveling and facing in the direction opposite to the other vehicle 51 in FIG. 2(*a*), and the other vehicle 51B and the other vehicle 51 are at the same position relative to the own vehicle 50.

In another example as shown in FIG. 3, the early determination area setting section 34 may set the early determination area 73 obtained by extending the blind spot area 63 in the negative X-direction along the orientation and the traveling direction of the other vehicle 53, which is an obstacle (i.e., the negative X-direction).

The early determination area setting section 34 may be configured to set, as an early determination area, an area obtained by extending the blind spot area toward the position at which the own vehicle path estimated based on the traveling state of the own vehicle and the obstacle path estimated based on the traveling state of the obstacle cross each other. FIG. 2(*c*) illustrates the path 50P of the own vehicle 50 and the path 51P of the other vehicle 51, which is an obstacle, with the own vehicle 50 and the other vehicle 51 having the same positions and traveling states as shown in FIG. 2(*a*). As shown in FIG. 2(*c*), an extension area 71E is set for the blind spot area 60 toward the position at which the path 50P and the path 51P cross each other, that is, in the negative Y-direction. Then, the early determination area 71 is set including the blind spot area 60 and the extension area 71E.

The early determination area setting section 34 may be configured to set, as an early determination area, an area obtained by extending the blind spot area toward the own vehicle path estimated based on the traveling state of the own vehicle. FIG. 2(*d*) illustrates the path 50P of the own vehicle 50 with the own vehicle 50 and the other vehicle 51 having the same positions and traveling states as shown in FIG. 2(*a*). As shown in FIG. 2(*d*), an extension area 72E is set for the blind spot area 60 toward the path 50P, that is, in the negative Y-direction. Then, an early determination area 72 is set including the blind spot area 60 and the extension area 72E.

As shown in FIGS. 2(*a*) to (*d*), the early determination area setting section 34 can set an early determination area extended simply in the traveling direction of an obstacle, in which the possibility of a collision with the own vehicle is high, thus reducing the computational load in the collision determination within the early determination area to accelerate the collision determination further. However, the early determination area setting section 34 may also be configured to set an early determination area extended away from the traveling direction of the obstacle, or in the direction in which the possibility of a collision with the own vehicle is relatively low. In other words, in FIGS. 2(*a*) to (d), extension areas may also be provided both in the positive and the negative Y-directions.

The early determination area setting section 34 may be configured to determine the size of the early determination area. The size of the early determination area varies with the size of the extension area. That is, the early determination area setting section 34 may be configured to determine the size of the extension area to determine the size of the early determination area.

The extension area may be an area extended substantially evenly in each direction of extension. For example, in FIG. 2(*a*), the extension area 70E may have a constant Y-directional size at any X-directional position.

In contrast, the extension area may vary in size depending on the direction of extension. For example, in FIG. 2(*a*), the Y-directional size of the extension area 70E may vary with X-directional positions. More specifically, the Y-directional size of the extension area 70E may increase with decreasing X-directional distance to the own vehicle 50. In another example in which extension areas are set not only in the traveling direction of the obstacle, but also in the direction opposite to the traveling direction or other direction, the extension area extending in the traveling direction of the obstacle, in which the possibility of a collision with the own vehicle is higher, may be larger than the extension area extended in the other direction. Specifically, in FIG. 2(*a*), an extension area may be set in a direction different from the negative Y-direction, which is the traveling direction of the other vehicle 51 (e.g., in the positive Y-direction). In this case, the extension area extended in the negative Y-direction may be larger than the extension area extended in the positive Y-direction. In FIG. 2(*b*), an extension area may be set in a direction different from the positive Y-direction, which is the traveling direction of the other vehicle 51B (e.g., in the negative Y-direction). In this case, the extension area extended in the positive Y-direction may be larger than the extension area extended in the negative Y-direction.

The early determination area setting section 34 may determine the size of the extension area as a predetermined fixed value, and the fixed value may be stored in the ECU 30. The early determination area setting section 34 may also be configured to determine the size of the extension area based on at least one of the velocity of the obstacle and the relative velocity of the obstacle to the own vehicle.

A specific example will now be described with reference to FIG. 2(*a*). For example, during the cyclic execution of driving assistance control processing, the other vehicle 52 may suddenly emerge from the blind spot area 60 and be sensed in the extension area 70E of the early determination area 70. In this case, with increasing velocity of the other vehicle 51, which is an obstacle, the likelihood of the other vehicle 52 running far behind the other vehicle 51 increases in the next processing cycle. Thus, it is preferable to enlarge the early determination area in which collision determination processing is accelerated, speeding up the processing per cycle. In other words, it is preferable to enlarge the extension area 70E as the velocity of the other vehicle 51, which is an obstacle, increases.

Similarly, as shown in FIG. 2(*b*), when the other vehicle 51B, which is an obstacle, is traveling in the same direction as the own vehicle 50, it is preferable to enlarge an extension area 77E as the velocity of the other vehicle 51B, which is an obstacle, increases.

Also when the relative velocity of an obstacle to the own vehicle is high, it is preferable to enlarge the extension area. In other words, as the relative velocity of the other vehicle 51 or 51B, which is an obstacle, to the own vehicle 50 increases, it is preferable to enlarge the extension area 70E or 77E.

The size of the early determination area (or the size of the extension area) may be stored in the ECU 30 as a numerical expression, a map, or a database indicating the relationship with a predetermined parameter such as the relative velocity of an obstacle to the own vehicle. The early determination area setting section 34 may acquire the predetermined parameter to calculate the size of the early determination area based on, for example, the numerical expression stored in the ECU 30.

The early determination area setting section 34 may be configured to change the way of setting an early determination area based on the environmental road information. For example, as shown in FIG. 5, when the own vehicle 50 enters an intersection, the early determination area setting section 34 may be configured to set an early determination area that is the early determination area 75 including an extension area 75E extending from the blind spot area 65 toward the own vehicle 50. When the own vehicle 50 turns right at the intersection from the road 81 to the road 82, a moving body passing straight across the intersection along the road 81 may emerge toward the own vehicle 50 from the blind spot area 65. A collision with such a moving body can easily be avoided by setting the early determination area 75 extended toward the own vehicle 50.

Figure 6:
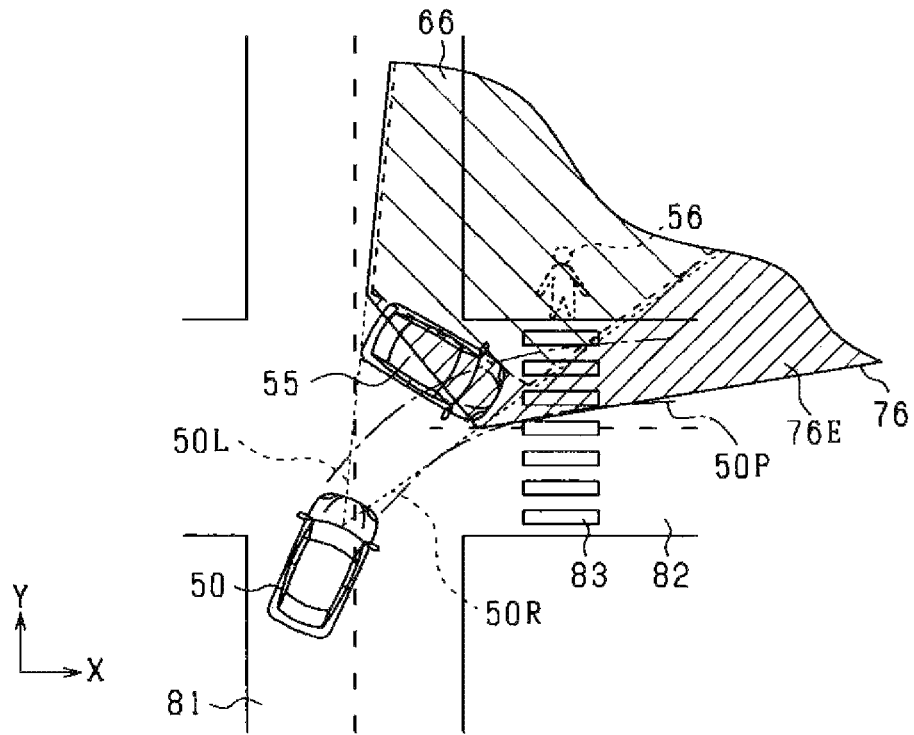
FIG. 6 illustrates a blind spot area and an early determination area at an intersection.

In another example as shown in FIG. 6, when the own vehicle 50 enters an intersection, the early determination area setting section 34 may be configured to set an early determination area 76 including an extension area 76E extending from a blind spot area 66 along the path 50P of the own vehicle 50 estimated based on the traveling state of the own vehicle 50. In FIG. 6, the negative Y-directional end of the early determination area 76 is extended to the rightward path of the own vehicle 50 in the path 50P. When the pedestrian 56 about to cross at the crosswalk 83 suddenly emerges from the blind spot area 66, the above setting facilitates avoidance of the danger of a collision with the own vehicle 50.

In collision determination, the collision determination section 35 first determines the presence or absence of the possibility that an object around the own vehicle may collide with the own vehicle (collision possibility). Then, for the object determined to have a collision possibility, the collision determination section 35 performs activation determination as to whether to activate the controlled device 40. The collision determination performed by the collision determination section 35 includes the collision possibility determination and the activation determination.

Specifically, the collision determination section 35 uses the own vehicle path estimated based on the traveling state of the own vehicle and the object path estimated based on the moving state of an object around the own vehicle to determine whether the object around the own vehicle may collide with the own vehicle. For example, when the path of the own vehicle and the path of the object around the own vehicle are in contact or close to each other, the collision determination section 35 determines the presence of a collision possibility between the own vehicle and the object. In contrast, when the path of the own vehicle and the path of the object around the own vehicle are apart from each other, the collision determination section 35 determines the absence of a collision possibility. Note that the own vehicle path and the object path may be estimated by any method, such as a conventionally known estimation method.

The collision determination section 35 further calculates the time to collision (TTC) for the object determined to have a collision possibility. The time to collision is the time left until the own vehicle and the object collide with each other, and can be calculated based on the relative distance between the own vehicle and the object. Then, the time to collision and the activation timing set for the controlled device 40 are compared to determine whether to activate the controlled device 40 for avoidance of the collision. Note that the activation timing refers to the timing to activate the controlled device 40. Different activation timings may also be set for the targets to be activated (such as the alarm 41 and the brake 42).

The collision determination section 35 accelerates the collision determination for an object sensed by the radar 21 or the imager 22 within the early determination area, compared with the collision determination for an object sensed outside the early determination area. Specifically, the collision determination section 35 determines whether the own vehicle will collide with an object detected within the early determination area in a collision determination period shorter than for an object detected outside the early determination area. Note that the collision determination period is the time taken to conclude the determination as to whether the object and the own vehicle will collide with each other.

The collision determination section 35 may accelerate either one or both of the collision possibility determination and the activation determination for an object sensed within the early determination area. The collision determination section 35 may be configured to accelerate the collision determination evenly at any position within the early determination area. In contrast, the collision determination section 35 may also be configured to change the degree of acceleration of the collision determination in accordance with the position within the early determination area. For example, a position estimated to have a greater collision possibility in the early determination area may be associated with a higher degree of (further) acceleration. Specifically, the collision determination section 35 may be configured to accelerate the collision determination further at a position closer to the own vehicle within the early determination area.

Specifically, for example, a shorter collision determination period is set by relaxing the conditions used for collision determination. The conditions include the number of images (the number of frames) used to determine the path of a moving object and the lateral movement distance (absolute value) of the moving object.

For a condition concerning the number of images, the relaxation of the condition refers to reducing the number of images. For a condition concerning the movement distance, the relaxation of the condition refers to lowering the value of the distance. This enables the collision determination between the object and the own vehicle to be concluded earlier. The degree of relaxation of the conditions can be changed to change the degree of acceleration.

When the collision determination section 35 determines the controlled device 40 to be activated, the driving assistance section 36 issues a command to the controlled device 40 to perform control associated with collision avoidance such as notification or braking.

Figure 7:
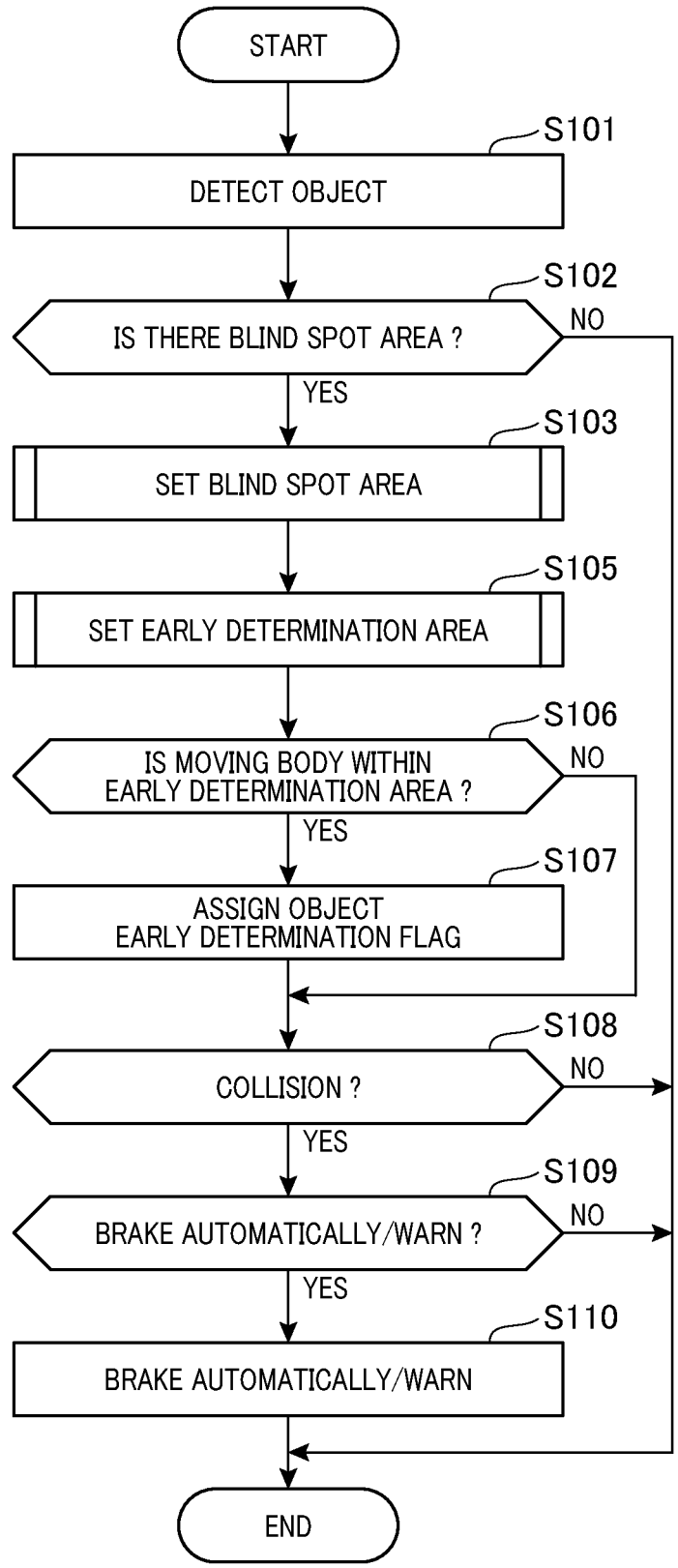
FIG. 7 is a flowchart of driving assistance control according to the first embodiment.

An example of the driving assistance control performed by the ECU 30 according to the first embodiment will now be described with reference to a flowchart shown in FIG. 7. The process shown in FIG. 7 is repeated at fixed intervals during the operation of the own vehicle.

First, in step S101, an object around the own vehicle is sensed based on data obtained from the radar 21 and the imager 22. For example, the radar 21 senses an object, and the imager 22 obtains sensing points of the object to acquire information about its size and shape. Additionally, the type of the sensed object (e.g., a vehicle, a bicycle, a motorcycle, a person, an animal, or a stationary ground object such as a guardrail) is estimated. Then, the processing proceeds to step S102.

In step S102, it is determined whether there is a blind spot area. For example, it is determined whether the object sensing devices such as the radar 21 and the imager 22 have a blind spot (an area that cannot be sensed by the object sensing devices). If there is a blind spot, the presence of a blind spot area is determined, and the processing proceeds to step S103. If there is no blind spot, the absence of a blind spot area is determined, and the processing is ended.

In step S103, the blind spot area is set for the sensed obstacle. An example of the processing in step S103 is shown in FIG. 8.

Figure 8:
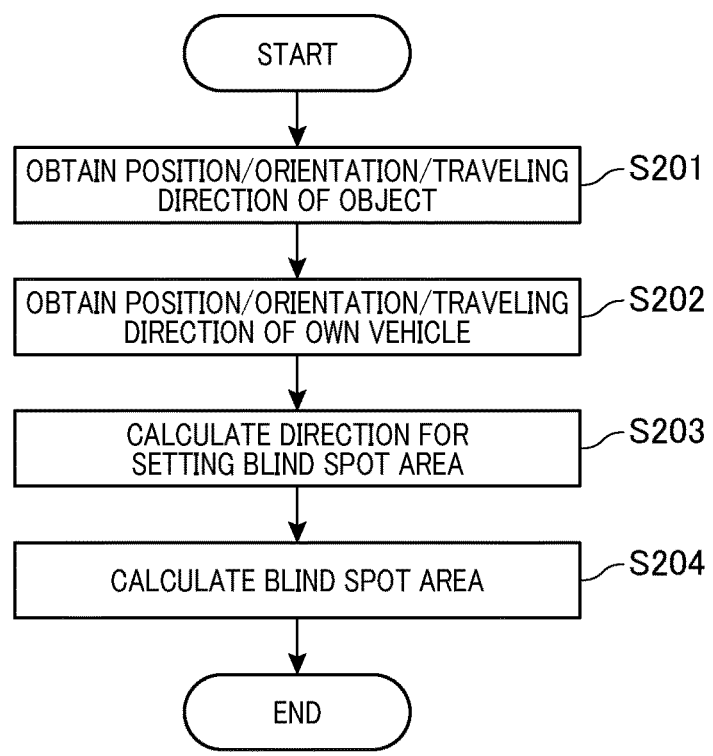
FIG. 8 is a flowchart of a blind spot area setting process.

In step S201 in FIG. 8, the position, the orientation, and the traveling direction of the obstacle are obtained. Note that the position, the orientation, and the traveling direction of the obstacle can be calculated based on sensing information obtained from the radar 21 and the imager 22.

Subsequently, in step S202, the position, the orientation, and the traveling direction of the own vehicle are obtained. Then, the processing proceeds to step S203. The position, the orientation, and the traveling direction of the own vehicle can be calculated based on sensing information obtained from the speed sensor 23, the steering angle sensor 24, and the yaw rate sensor 25.

In step S203, the direction for setting the blind spot area is calculated based on the information obtained in steps S201 and S202. For example, the position of the obstacle relative to the own vehicle is used to calculate the opposite direction of the obstacle to the own vehicle as the direction in which the blind spot area is set. Then, the processing proceeds to step S204.

In step S204, the blind spot area is set. For example, multiple sensing points indicating the outer edge of the obstacle are extracted from the sensing points obtained by the imager 22 in step S101 in FIG. 7. Based on the angle formed by the own vehicle and the extracted sensing points, the blind spot area is set. Then, the processing ends and proceeds to step S105 in FIG. 7.

In step S105, for the blind spot area set in step S103, an early determination area including the blind spot area and extended from the blind spot area is set. An example of the processing in step S105 is shown in FIG. 9.

Figure 9:
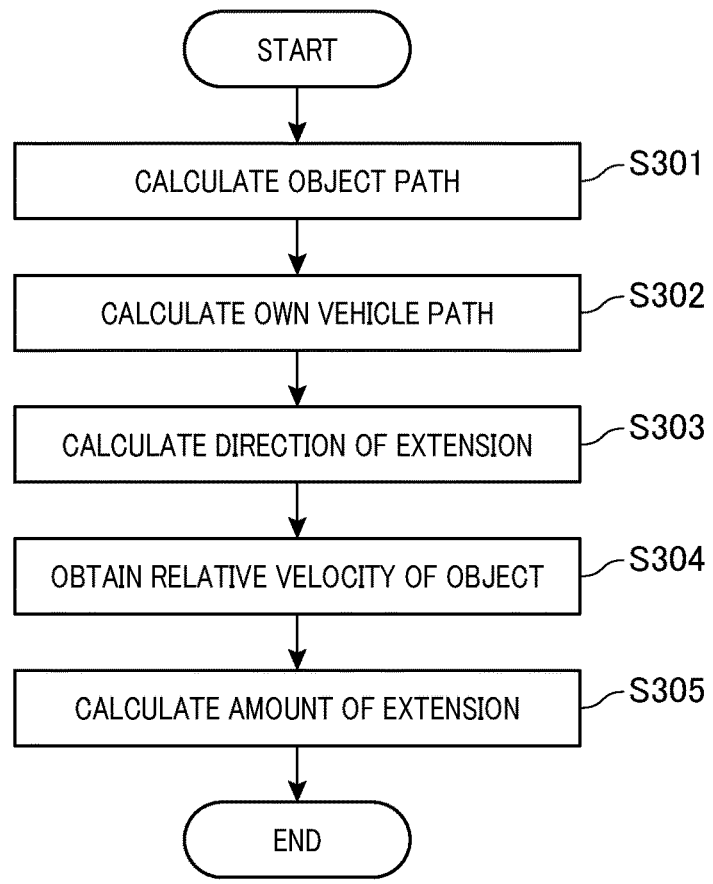
FIG. 9 is a flowchart of an early determination area setting process.

In step S301 in FIG. 9, the path of the obstacle is calculated. The path of the obstacle can be calculate based on, for example, the position, the traveling direction, and the velocity of the obstacle. Then, in step S302, the path of the own vehicle is calculated. The path of the own vehicle can be calculated based on, for example, the position, the traveling direction, and the velocity of the own vehicle. After step S302, the processing proceeds to step S303.

In step S303, the direction in which the early determination area extends from the blind spot area is calculated. In other words, the direction for setting the extension area extending from the blind spot area is calculated. For example, the crossing position of the obstacle path calculated in step S301 and the own vehicle path calculated in step S303 is calculated, and the direction to the crossing position can be set as the extending direction of the early determination area. Then, the processing proceeds to step S304.

In step S304, the relative velocity of the obstacle to the own vehicle is calculated. The relative velocity can be calculated based on, for example, the sensing information obtained from the radar 21. Then, the processing proceeds to step S305.

In step S305, the amount of the extension of the early determination area is calculated based on the relative velocity of the obstacle to the own vehicle calculated in step S304.

The ECU 30 stores data such as a numerical expression or a database indicating the relationship between the amount of extension and the relative velocity of the obstacle to the own vehicle. The relative velocity calculated in step S304 is applied to the data such as the numerical expression or the database to calculate the amount of the extension of the early determination area. Then, the processing ends and proceeds to step S106 in FIG. 7.

In step S106, it is determined whether a moving body is found within the early determination area set in step S105 for the object sensed in step S101. If the moving body is found within the early determination area, the processing proceeds to step S107, in which an early determination flag is set to the moving body within the early determination area. Then, the processing further proceeds to step S108. If no moving body is found within the early determination area, the processing proceeds from step S106 to step S108, with no early determination flag set.

In step S108, it is determined whether there is a collision possibility that the object sensed in step S101 and the own vehicle may collide with each other (collision possibility determination). For example, if the distance between the path estimated for the object sensed in step S101 and the path estimated for the own vehicle is less than a predetermined distance, and the paths are in contact or close to each other, then the presence of the collision possibility is determined, and the processing proceeds to step S109. If the distance between the object path and the own vehicle path is equal to or more than the predetermined distance, and the paths are apart from each other, then the absence of the collision possibility is determined, and the processing is ended.

In step S109, it is determined whether to activate the alarm 41 and the brake 42 for the object around the own vehicle determined to have a collision possibility in step S108 (activation determination). It is determined whether to brake automatically or warn. Specifically, the time to collision TTC between the object and the own vehicle is calculated. For example, the TTC is calculated by dividing the direct distance from the current position of the own vehicle to the object by the relative velocity of the object to the own vehicle. Then, it is determined whether the calculated TTC is equal to or less than a threshold TH1 indicating the activation timing. If the TTC is equal to or less than the threshold TH1 (TTC≤TH1), the processing proceeds to step S110. If the TTC is more than the threshold TH1 (TTC>TH1), the processing is ended. Note that the activation timing for the alarm 41 is set at a value more than the activation timing for the brake 42.

For the object with the early determination flag set in step S107, the processing in step S108 and step S109 is accelerated compared with an object with no early determination flag set. In the processing in step S108 and step S109, the object with no early determination flag set is given a normal collision determination period, and the object with the early determination flag set is given a collision determination period shorter than the normal period.

In step S110, a command to automatically brake is output to the brake 42, while a command to warn is output to the alarm 41. Then, the processing is ended.

In the ECU 30 according to the first embodiment, the early determination area setting section 34 sets an early determination area, and for an object sensed within the early determination area, the collision determination section 35 shortens the collision determination period compared with the normal period. This enables acceleration of the collision determination between the own vehicle and an object appearing from the blind spot area.

Furthermore, the ECU 30 accelerates the collision determination as to a sensed object to enable appropriate avoidance of a collision with a moving body emerging from the blind spot area, thus eliminating the need for changing the sensing range of the object sensing devices such as the radar 21 and the imager 22. The use of a driving assistance device according to the ECU 30 for a vehicle incorporating existing object sensing devices enables more appropriate avoidance of a collision with a moving body emerging from the blind spot area. Note that the technique according to the ECU 30 may be combined with a technique for allowing the object sensing devices to more quickly sense a moving body emerging from the blind spot area.

Second Embodiment

In a second embodiment, another example of the driving assistance control performed by the ECU 30 described in the first embodiment will now be described with reference to a flowchart shown in FIG. 10. The process shown in FIG. 10 is repeated at fixed intervals during the operation of the own vehicle.

Figure 10:
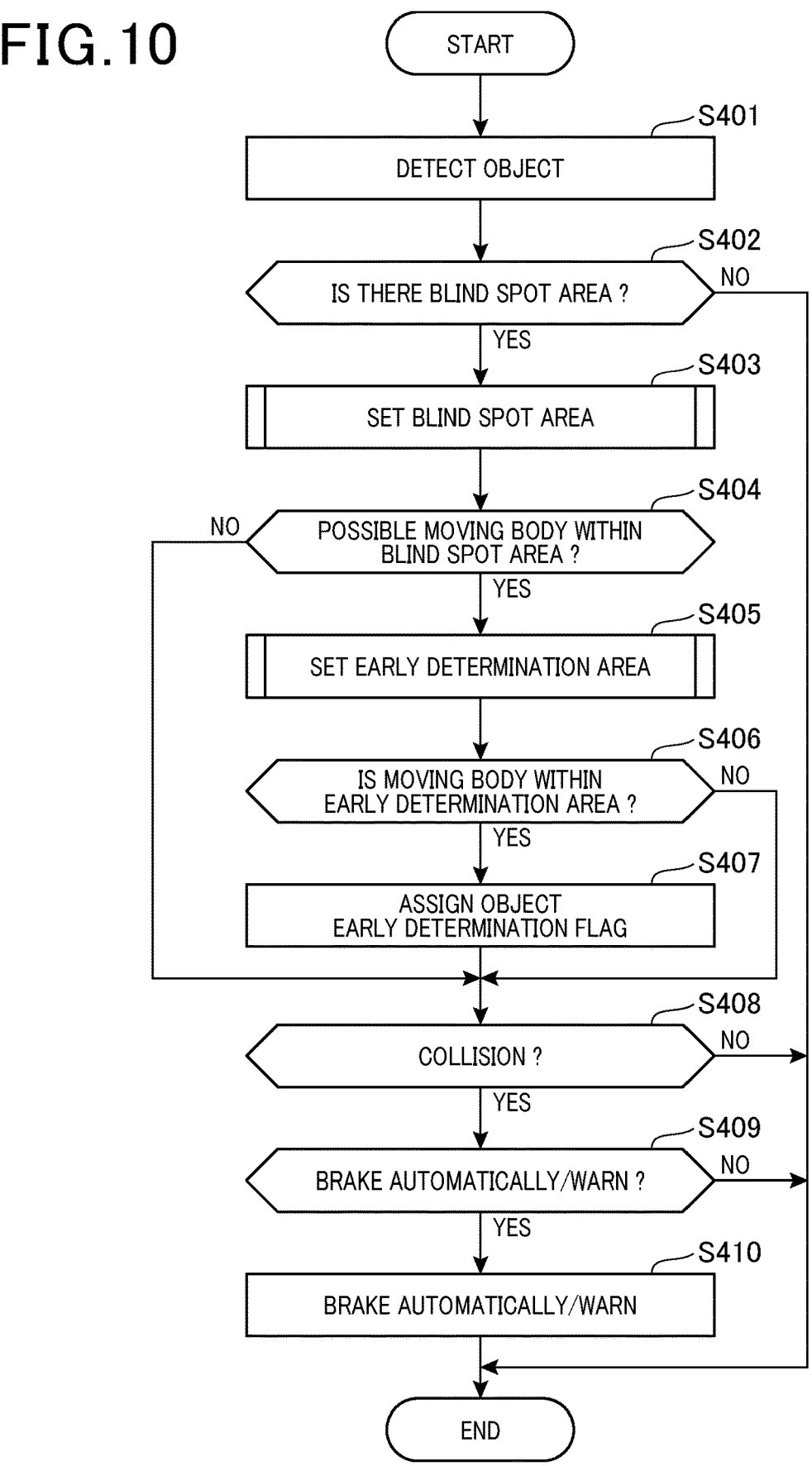
FIG. 10 is a flowchart of driving assistance control according to a second embodiment.

The flowchart shown in FIG. 10 differs from the process shown in FIG. 7 in including the further processing of step S404. The processing of steps S401 to S403, and steps S405 to S410 is the same as the processing of steps S101 to S103, and steps S105 to S110, and will not be described.

In FIG. 10, a blind spot area is set in step S403, and then the processing proceeds to step S404. In step S404, it is determined whether the blind spot area set in step S403 includes space for any moving body. If it is determined that such a space may be included, the processing proceeds to step S405, and the subsequent steps are performed in the same manner as in the first embodiment. In step S404, if it is determined that no such space is present, the processing proceeds to step S408 without the execution of the processing of steps S405 to S407.

In step S404, the possibility of the presence of space can be determined based on road information around the obstacle. For example, if the distance between the obstacle and the road edge of the traffic lane next to the obstacle is equal to or more than a predetermined road edge distance threshold, the blind spot area is estimated to include enough space, and it is determined that there is a possibility of presence. In contrast, if the distance between the obstacle and the road edge of the traffic lane next to the obstacle is less than the predetermined road edge distance threshold, the blind spot area is estimated to include not enough space, and it is determined that there is no possibility of presence.

The ECU 30 according to the second embodiment sets an early determination area when the affirmative determination result is provided in the determination of the possibility of presence in step S404, that is, when the blind spot area is determined to include space for any object other than the obstacle. The ECU 30 can thus avoid unnecessarily setting an early determination area when the blind spot area includes no moving body, and also avoid unnecessary computation.

Modifications

The driving assistance control process shown in FIG. 10 may further include the processing of setting an early determination area irrespective of the determination result of the possibility of presence in step S404 if a predetermined cancellation condition is satisfied. Examples of cancellation conditions include the own vehicle entering an intersection and about to turn right or left.

For example, if it is determined that there is no possibility of presence in step S404, processing is further performed to determine whether a predetermined cancellation condition is satisfied (cancellation condition determination processing). If a cancellation condition is determined to be satisfied, the processing proceeds to step S405. If no cancellation condition is determined to be satisfied, the processing proceeds to step S408.

The cancellation condition determination processing may be performed before step S404. For example, the cancellation condition determination processing may be performed immediately before step S404. In this case, if the cancellation condition determination processing provides the affirmative determination result (if a cancellation condition is determined to be satisfied), the processing may skip step S404 and proceed to step S405. If the negative determination result is provided, the processing may proceed to step S404.

The above embodiments enable the following advantageous effects to be achieved.

The ECU 30 functions as a driving assistance device that, based on determination as to whether the own vehicle 50 will collide with an object being around the own vehicle 50 and detected by the object detectors such as the radar 21 and the imager 22, that is, based on collision determination, performs collision avoidance control for avoidance of a collision between the own vehicle 50 and the object. The ECU 30 includes the object sensing section 32, the blind spot area setting section 33, the early determination area setting section 34, and the collision determination section 35. The object sensing section 32 senses an object around the own vehicle 50. The blind spot area setting section 33 sets the blind spot area 60, 63 to 66 at an area positioned in the blind spot of the own vehicle 50 blocked by the obstacle sensed by the object sensing section 32 (the other vehicle 51, 53 to 55). The early determination area setting section 34 sets the early determination area 70 to 73, 75, 76 including the blind spot area 60, 63 to 66 and extended from the blind spot area 60, 63 to 66. The collision determination section 35 accelerates the collision determination for an object sensed within the early determination area 70 to 73, 75, 76, compared with the collision determination for an object sensed outside the early determination area 70 to 73, 75, 76.

In the ECU 30, the early determination area setting section 34 sets the early determination area 70 to 73, 75, 76, and the collision determination section 35 accelerates the collision determination for an object sensed within the early determination area 70 to 73, 75, 76, thus enabling acceleration of the collision determination between the own vehicle 50 and an object appearing from the blind spot area 60, 63 to 66.

The ECU 30 accelerates the collision determination between the own vehicle 50 and an object appearing from the blind spot area 60, 63 to 66 (for example, the other vehicle 52 or the pedestrian 56), thus eliminating the need for changing the sensing range of the object sensing devices such as the radar 21 and the imager 22. In contrast, the ECU 30 may be configured to allow control for narrowing down the sensing range of the object sensing devices in combination with the above technique. For example, control may be performed for narrowing down the sensing range of the object sensing devices to within the early determination area.

The blind spot area setting section 33 may be configured to, for example, set a blind spot area beyond an obstacle (for example, the other vehicle 51, 53 to 55) from the own vehicle 50. Alternatively, the blind spot area setting section 33 may be configured to set a blind spot area based on the angle formed by the own vehicle 50 and the sensing points 51L and 51R indicating the outer edge of an obstacle. Alternatively, the blind spot area setting section 33 may be configured to set, within an area positioned in the blind spot of the vehicle, the blind spot area 60, 63 defined by a line 60L, 63N substantially parallel to the orientation or the traveling direction of the obstacle.

The early determination area setting section 34 may be configured to set the early determination area 70 to 73, 75, 76 for the blind spot area 60, 63 to 66 set for an obstacle (such as the other vehicle 51) sensed in the traveling direction of the own vehicle 50. For an obstacle sensed in a direction different from the traveling direction of the own vehicle 50, the early determination area may not be set. Even if a moving body emerges from the blind spot area of such an obstacle, the collision avoidance control will often be executable enough without accelerating the collision determination.

The early determination area setting section 34 may be configured to set an early determination area extended in a direction in which the possibility of a collision with the own vehicle 50 is high. This can reduce the computational load in the collision determination within the early determination area to accelerate the collision determination further.

For example, the early determination area setting section 34 may be configured to set the early determination area 71 obtained by extending the blind spot area 60 toward the position at which the path 50P of the own vehicle 50 estimated based on the traveling state of the own vehicle 50 and the path 51P of the obstacle (the other vehicle 51) estimated based on the traveling state of the obstacle cross each other.

Alternatively, the early determination area setting section 34 may be configured to set the early determination area 72 obtained by extending the blind spot area 60 toward the path 50P of the own vehicle 50 estimated based on the traveling state of the own vehicle 50.

Alternatively, the early determination area setting section 34 may be configured to set the early determination area 70, 73 obtained by extending the blind spot area 60, 63 along the orientation or the traveling direction of the obstacle (the other vehicle 51, 53).

Alternatively, when the own vehicle 50 moves toward an intersection, the early determination area setting section 34 may be configured to set the early determination area 75 obtained by extending the blind spot area 65 toward the own vehicle 50.

Alternatively, when the own vehicle 50 moves toward an intersection, the early determination area setting section 34 may be configured to set the early determination area 76 obtained by extending the blind spot area 66 along the path 50P of the own vehicle 50 estimated based on the traveling state of the own vehicle 50.

The early determination area setting section 34 may set the size of the early determination area 70 to 73, 75, 76 as a fixed value. Alternatively, the early determination area setting section 34 may be configured to determine the size of the early determination area 70 to 73, 75, 76 based on at least one of the velocity of the obstacle (such as the other vehicle 51) and the relative velocity of the obstacle to the own vehicle 50.

The early determination area setting section 34 may be configured to set an early determination area when the blind spot area 60, 63 to 66 is determined to include space for any object (for example, the other vehicle 52 or the pedestrian 56) other than the obstacle (such as the other vehicle 51).

When the own vehicle 50 moves toward an intersection, the early determination area setting section 34 may be configured to set the early determination area 70 to 73, 75, 76 irrespective of the result of determination as to whether the blind spot area 60, 63 to 66 includes space for any object other than the obstacle.

Although the present disclosure has been described based on the embodiments, it is to be understood that the present disclosure is not limited to the embodiments and configurations. The present disclosure encompasses various modifications and alterations falling within the range of equivalence. Additionally, various combinations and forms as well as other combinations and forms with one, more than one, or less than one element added thereto also fall within the scope and spirit of the present disclosure.

The present disclosure provides a driving assistance device (30) for performing collision avoidance control for avoidance of a collision between an own vehicle (50) and an object being around the own vehicle and detected by an object detector (21, 22), the collision avoidance control being performed based on collision determination as to a collision between the own vehicle and the object. The driving assistance device includes: an object sensing section (32) configured to sense an object around the own vehicle; a blind spot area setting section (33) configured to set a blind spot area (60, 63 to 66) at an area positioned in an own vehicle's blind spot blocked by an obstacle (51, 53 to 55), which is a moving body, sensed by the object sensing section; an early determination area setting section (34) configured to set an early determination area (70 to 73, 75, 76) including the blind spot area and extended from the blind spot area along a path of the obstacle estimated based on a traveling direction of the obstacle or a traveling state of the obstacle; and a collision determination section (35) configured to accelerate the collision determination for an object sensed in the early determination area, compared with the collision determination for an object sensed outside the early determination area.

In the driving assistance device according to the present disclosure, the early determination area setting section sets an early determination area including the blind spot area and extended from the blind spot area. Then, the collision determination for an object sensed in the early determination area is accelerated compared with the collision determination for an object sensed outside the early determination area. The processing in the driving assistance device accelerates the collision determination for an object sensed in the early determination area, enabling acceleration of the collision determination between the own vehicle and an object appearing from the blind spot area, and also more appropriate avoidance of a collision between the own vehicle and an object emerging from the blind spot area.

What is claimed is:

1. A driving assistance device for performing collision avoidance control for avoidance of a collision between an own vehicle and an object being around the own vehicle and detected by an object detector, the collision avoidance control being performed based on collision determination as to a collision between the own vehicle and the object, the driving assistance device comprising:
an object sensing section configured to sense an object around the own vehicle;
a blind spot area setting section configured to set a blind spot area at an area positioned in an own vehicle's blind spot blocked by an obstacle, which is a moving body, sensed by the object sensing section;
an early determination area setting section configured to set an early determination area including the blind spot area and extended from the blind spot area along a path of the obstacle estimated based on a traveling direction of the obstacle or a traveling state of the obstacle; and
a collision determination section configured to accelerate the collision determination for an object sensed in the early determination area, compared with the collision determination for an object sensed outside the early determination area,
wherein
the collision avoidance control of the own vehicle is performed based on the collision determination to avoid a collision between the own vehicle and the object.

2. The driving assistance device according to claim 1, wherein
the early determination area setting section sets the early determination area for the blind spot area set for the obstacle sensed in a traveling direction of the own vehicle.

3. The driving assistance device according to claim 1, wherein
the blind spot area setting section sets the blind spot area beyond the obstacle from the own vehicle.

4. The driving assistance device according to claim 1, wherein
the blind spot area setting section sets the blind spot area based on an angle formed by the own vehicle and sensing points indicating an outer edge of the obstacle.

5. The driving assistance device according to claim 1, wherein
the blind spot area setting section sets, within the area positioned in the own vehicle's blind spot, the blind spot area defined by a line substantially parallel to an orientation or the traveling direction of the obstacle.

6. The driving assistance device according to claim 1, wherein
the early determination area setting section sets the early determination area obtained by extending the blind spot area toward a position at which a path of the own vehicle estimated based on a traveling state of the own vehicle and a path of the obstacle estimated based on the traveling state of the obstacle cross each other.

7. The driving assistance device according to claim 1, wherein
the early determination area setting section sets the early determination area obtained by extending the blind spot area toward a path of the own vehicle estimated based on a traveling state of the own vehicle.

8. The driving assistance device according to claim 1, wherein
when the own vehicle moves toward an intersection, the early determination area setting section sets the early determination area obtained by extending the blind spot area toward the own vehicle.

9. The driving assistance device according to claim 1, wherein
when the own vehicle moves toward an intersection, the early determination area setting section sets the early determination area obtained by extending the blind spot area along a path of the own vehicle estimated based on a traveling state of the own vehicle.

10. The driving assistance device according to claim 1, wherein
the early determination area setting section determines a size of the early determination area based on at least one of a velocity of the obstacle and a relative velocity of the obstacle to the own vehicle.

11. The driving assistance device according to claim 1, wherein
the early determination area setting section sets the early determination area when the blind spot area is determined to include space for any object other than the obstacle.

12. The driving assistance device according to claim 11, wherein
when the own vehicle moves toward an intersection, the early determination area setting section sets the early determination area irrespective of a result of determination as to whether the blind spot area includes space for any object other than the obstacle.

13. A driving assistance device for performing collision avoidance control for avoidance of a collision between an own vehicle and an object being around the own vehicle and detected by an object detector, the collision avoidance control being performed based on collision determination as to a collision between the own vehicle and the object, the driving assistance device comprising:
an object sensing section configured to sense an object around the own vehicle;
a blind spot area setting section configured to set a blind spot area at an area positioned in an own vehicle's blind spot blocked by an obstacle sensed by the object sensing section;
an early determination area setting section configured to set an early determination area including the blind spot area and extended from the blind spot area; and
a collision determination section configured to accelerate the collision determination for an object sensed in the early determination area, compared with the collision determination for an object sensed outside the early determination area, wherein
the early determination area setting section sets the early determination area when the blind spot area is determined to include space for any object other than the obstacle,
wherein
the collision avoidance control of the own vehicle is performed based on the collision determination to avoid a collision between the own vehicle and the object.

14. The driving assistance device according to claim 13, wherein
when the own vehicle moves toward an intersection, the early determination area setting section sets the early determination area irrespective of a result of determination as to whether the blind spot area includes space for any object other than the obstacle.

* * * * *